United States Patent [19]

Morita et al.

[11] Patent Number: 5,024,728
[45] Date of Patent: Jun. 18, 1991

[54] DEVOLATILIZATION OF LIQUID COMPOSITION CONTAINING POLYMER AND VOLATILE CONSTITUENTS

[75] Inventors: Tsuyoshi Morita; Kyotaro Shimazu, both of Chiba; Masataka Furukawa, Koshigaya, all of Japan

[73] Assignee: Dainippon Ink and Chemicals, Inc., Tokyo, Japan

[21] Appl. No.: 399,003

[22] Filed: Aug. 28, 1989

[30] Foreign Application Priority Data

Aug. 29, 1988 [JP] Japan .................................. 63-214075

[51] Int. Cl.$^5$ ............................................. B01D 1/06
[52] U.S. Cl. .................................. 159/27.4; 159/43.1; 159/47.1; 159/DIG. 10; 159/DIG. 16; 528/501
[58] Field of Search .............. 159/47.1, DIG. 10, 43.1, 159/27.4, DIG. 16; 202/265, 205, 175, 262; 203/91; 525/232; 528/501

[56] References Cited

U.S. PATENT DOCUMENTS

| | | | |
|---|---|---|---|
| 3,849,232 | 11/1974 | Kessler et al. | 159/13.1 |
| 3,886,049 | 5/1975 | Bir et al. | 159/2.3 |
| 3,940,453 | 2/1976 | Labana et al. | 526/320 |
| 3,966,538 | 6/1976 | Hagberg | 159/DIG. 10 |
| 4,153,501 | 5/1979 | Fink et al. | 159/27.4 |
| 4,294,652 | 10/1981 | Newman | 159/DIG. 16 |
| 4,356,116 | 10/1982 | Beers | 526/477 |
| 4,495,028 | 1/1985 | Rowe | 159/47.1 |
| 4,555,384 | 11/1985 | Morris et al. | 526/342 |
| 4,699,976 | 10/1987 | Matsubara et al. | 525/233 |
| 4,728,701 | 3/1988 | Jarvis et al. | 526/65 |
| 4,744,957 | 5/1988 | Imai et al. | 159/27.4 |

FOREIGN PATENT DOCUMENTS 679727 10/1966 Belgium .
2126116 3/1984 United Kingdom .

Primary Examiner—Virginia Manoharan
Attorney, Agent, or Firm—Sherman and Shalloway

[57] ABSTRACT

An apparatus for devolatilizing liquid composition containing polymer and volatile constituents including a heat exchanger, a volatilizer coupled to the underside of the heat exchanger and a vacuum connected to the volatilizer, the apparatus further comprising a distributor provided between the heat exchanger and the volatilizer; and a method of devolatilizing liquid composition containing polymer and volatile constitutents using a devolatilization apparatus, the devolatilization apparatus comprising a heat exchanger, a volatilizer coupled to the underside of said heat exchanger, a vacuum connected to the volatilizer and a distributor provided between the heat exchanger and volatilizer.

11 Claims, 4 Drawing Sheets

DEVOLATILIZATION OF LIQUID COMPOSITION CONTAINING POLYMER AND VOLATILE CONSTITUENTS

BACKGROUND OF THE INVENTION

1. Field of the Invention

This invention relates to a devolatilization apparatus to be provided for a first step of equipment for manufacturing thermoplastic resins such as styrene polymers to remove continuously and efficiently unreacted monomer, solvent and like volatile substances from a liquid composition containing polymer and volatile constituents (hereinafter referred to as polymer solution) and a method for devolatilization using the same apparatus.

2. Discussion of the Prior Art

Usually, when causing bulk or solution polymerization of styrene either alone or together with other copolymerizable monomers, the polymerization reaction is discontinued when polymerization of 40 to 90% by weight of monomer has occurred, and unreacted monomer remaining in the resultant polymer solution, and solvent and like volatile substance also remaining in the solution in the case of the solution polymerization, is separated. Particularly, low residual volatile component content is required in case of styrene polymer used for food containers or the like. When performing devolatilization operation, it is important for obtaining satisfactory quality of polymer to pay attention lest the polymerization proceeds excessively and also lest the polymer solution should be exposed to a high temperature for long time, thus avoiding quality deterioration due to otherwise possible generation of low molecular weight polymers or crosslinking with rubber phase in case where a rubber component is contained.

An apparatus for removing volatile components of a styrene-based polymer solution usually includes a heat exchanger for giving the polymer solution an amount of heat necessary for the evaporation of the volatile components and also heating the polymer solution after the evaporation of the volatile components to maintain adequate fluidity of polymer, a devolatilizer for causing evaporation of volatile components contained in the polymer solution and vacuum means. To obtain high quality polymer, i.e., to reduce quality degradation of polymer under a high temperature condition, it is desired to minimize the distance between the heat exchanger and devolatilizer, increase the surface area of the polymer solution per unit volume in the devolatilizer and increase the amount of evaporation of the volatile components. As apparatus with a minimum distance between the heat exchanger and devolatilizer, U.S. Pat. Nos. 4,537,795 and 4,699,976 disclose structures, in which a vertical multi-tube heat exchanger for heating polymer solution taken out from a polymerization process is disposed on a devolatilizer to permit the polymer solution having passed through the heat exchanger to flow down immediately into the devolatilizer while forming bubbles. The prior arts noted above also propose to add, in the use of the apparatus, a bubble-forming agent such as water or alcohol to polymer solution for improving the devolatilization efficiency.

However, in the disclosed apparatus the evaporation surface area of the polymer solution is limited by the number and diameter of the heat exchanger tubes. This means that a limitation is imposed on the reduction of the amount of volatile components remaining in the polymer solution after the devolatilization treatment. If it is intended to elevate the temperature of the polymer solution for reducing the content of the residual volatile components, low molecular weight polymer will be produced to degrade the quality of polymer. It is proposed to perform devolatilization in two or three steps in order to solve the above problem. With this method, however, sufficient effects cannot be obtained.

An object of the invention is to provide efficient apparatus and method for devolatilizing polymer solution, i.e., liquid composition containing polymer and volatile constituents, which permit reduction of the concentration of residual volatile components in the polymer solution to 300 ppm or below without need of any great equipment investment or energy consumption.

SUMMARY OF THE INVENTION

The inventors conducted extensive researches and investigations and found that the above object of the invention can be attained by an apparatus having a construction that a volatilizer connected to vacuum means is coupled to the underside of a heat exchanger for heating polymer solution with a distributor provided between the heat exchanger and volatilizer, as well as a method using such apparatus.

More specifically, according to the invention there are provided an apparatus for devolatilizing a liquid composition containing polymer and volatile constituents, which apparatus comprises a heat exchanger, a volatilizer coupled to the underside of the heat exchanger and vacuum means connected to the volatilizer and is characterized by a distributor provided between the heat exchanger and volatilizer, and a method for devolatilizing a liquid composition containing polymer and volatile constituents, which method uses the apparatus noted above.

DETAILED DESCRIPTION OF THE INVENTION AND PREFERRED EMBODIMENTS

The heat exchanger used according to the invention is not particularly limited so long as it can heat polymer solution. However, a vertical multi-tube heat exchanger may suitably be used. Where the content of unreacted monomer, solvent and other volatile constituents is 1% by weight or above, a suitable heat exchanger to be used may have a structure, in which a plurality of static mixing elements free from any moving parts are provided in each tube for mixing the polymer solution and preventing channelling. On the other hand, where the content of volatile constituents is no higher than 1% by weight, a heat exchanger without any mixing element is suitable because of increased pressure rise in the tube.

As the plurality of mixing elements there may be those for mixing polymer solution by repeating the splitting of the stream of polymer solution entering the tube, changing of the direction of flow and direction of splitting and joining of the split streams. Examples of such mixer are Sulzer-type tubular mixer and Kenix-type static mixer.

The distributor used according to the invention is not particularly limited so long as it can distribute the flow path of polymer solution and withstand pressure received at the time of the distribution. As an example, the distributor may be plate-like with a number of slits or holes of other shapes. The shape of the holes is by no means limitative. As an example, the holes may be slit-like, circular, polygonal above triangular, star-shaped, parallelogramic, gourd-shaped, etc. Theoretically, it is preferred that the area of the holes is reduced progressively as one goes toward the downstream side in the flow path of polymer solution. In view of balance between the cost of processing and performance, however, circular holes having a fixed area are suitable.

The size, number and arrangement of the distributor holes, which may be slit-like, circular, etc., should be such that the surface area of polymer solution appearing from the distributor is sufficiently greater than the surface area of polymer solution in case when it is forced out directly from the heat exchanger into the devolatilizer with the same rate of flow per unit time and also that no excessive pressure is applied to the distributor. Further, suitably no substantial difference in speed velocity is produced among the polymer solution streams through the individual holes. For example, when using a vertical multi-tube heat exchanger with a tube inner diameter of 10 to 50 mm and a distributor having circular holes, the diameter b of the circular hole is usually selected in a range of $3 < a/b < 10$. Specifically, each tube is suitably provided with 4 to 10 circular holes with a diameter of 3 to 5 mm. Further, as an arrangement of holes suitably no hole is provided in a central portion of the distributor for doing so permits uniformity of speed velocity of polymer solution streams through the individual holes to be readily obtained.

The distributor may be mounted in any suitable way. As an example, it may be mounted on a tube plate of the heat exchanger by using steel bars, support plates, bolts, etc., or it may be mounted directly, such as by welding, on each of the outlet ends of the heat exchanger tubes.

Of these methods of mounting, the latter method permits polymer solution streams emerging from the individual heat exchanger tubes to be led directly, i.e., without joining together, to the distributor. Thus, in this case it is possible to readily obtain uniformity of speed velocity of polymer solution streams at the distributor outlet. In addition, it is possible to distribute polymer solution for devolatilization by maintaining the state of mixing of polymer solution in the heat exchanger. This is desired in view of suppressing variations or reduction of the devolatilization efficiency.

In the former method of mounting, the polymer solution streams appearing from the individual heat exchanger tubes are joined together before being led to the distributor. Therefore, compared to the latter method there is a greater possibility of lack of uniformity of speed velocity of the distributed polymer solution streams from the distributor. Also, there is a greater possibility of changes in the state of polymer solution, for instance separation of part of a bubble-forming agent from the polymer solution, due to such causes as reduction of pressure when the polymer solution streams emerging from the heat exchanger are joined together. To reduce or eliminate these possibilities, the distance between the tube plate and distributor is suitably reduced to be 40 mm or below so that the volume defined by the tube plate and distributor is 10% or below of the total volume of the heat exchanger.

The volatilizer according to the invention is coupled to the underside of the heat exchanger, and it is also connected to vacuum means consisting of a vacuum pump or the like for producing vacuum or a reduced pressure in the volatilizer. As an example, it may be one which is usually used in an apparatus for manufacturing styrene-based resin. As vacuum means may be used one which can hold a volatilizer inner pressure of 10 to 100 mmHg.

Since the devolatilization apparatus according to the invention includes a distributor provided between a heat exchanger and a volatilizer, as polymer solution flowing down from the heat exchanger passes through the distributor, a shape of polymer is changed to one having a large surface area, for instance, a film-like, a plate-like or a thin bar-like form, suitable for devolatilization, and in this shape it is supplied directly to the volatilizer and then subjected to bubble formation. As a result, the devolatilization efficiency is extremely improved. Suitably, heat retaining tubes may be provided in the volatilizer. In this case, polymer solution supplied to the volatilizer is temporarily received and heated by the heat retaining tubes before falling. Thus, the devolatilization efficiency can be further improved.

The devolatilization apparatus for devolatilizing polymer solution according to the invention can be used for devolatilizing thermoplastic polymer solutions containing unreacted monomer, solvent and other volatile constituents. Particularly, it is suitably used for devolatilization of styrene-based polymer solutions either rubber-modified or not. Particularly, it is suitable for devolatilization of styrene-based polymer solution, either rubber-modified or not, obtained by performing polymerization until a comparatively high polymerization conversion of 80 to 95% by weight is obtained. For it is possible to obtain efficient volatilization in a state, in which low molecular polymer can be difficultly produced.

For the method of devolatilization according to the invention the apparatus for devolatilizing polymer solution according to the invention may suitably be used instead of the prior art devolatilization apparatus for polymer solution. As an example of carrying out the method according to the invention, (1) polymer solution with a polymerization conversion of 40 to 90% by weight is devolatilized until the volatile constituent content is 1% by weight or below by using one or two stages of prior art devolatilization apparatus for polymer solution, then a bubble-forming agent such as water or alcohol is added, if necessary, and then devolatilization is performed under conditions of a temperature of 200 to 270° C. and volatilizer inner pressure of 20 to 30 mmHg, for instance, using the polymer solution volatilizer according to the invention. Another example of carrying out the method according to the invention, (2) polymer solution with a polymerization conversion of 80 to 95% by weight is devolatilized until the volatile constituent content is 1% by weight or below, preferably 0.2 to 0.5% by weight, by using one or two stages of the polymer solution devolatilization apparatus according to the invention, preferably one including a heat exchanger with a plurality of static mixing elements without any moving parts provided in each tube and under conditions of a temperature of 200 to 250° C. and a pressure of 10 to 100 mmHg, then a bubble-forming agent such as water or alcohol is added, if necessary, and then performing volatilization in the same way as in the example (1). The bubble-forming agent such as water or alcohol may be added and mixed by any means. As an example, this may be done by using a tubular mixer with a plurality of inner static mixing elements without any moving parts, for instance, Sulzer-type tubular mixer or Kenix-type static mixer. Usually, the bubble-forming agent is added in an amount of 0 to 5 parts by weight, preferably 0.5 to 3 parts by weight, to 100 parts by weight of the solid phase of polymer.

The invention will now be described in greater detail with reference to the accompanying drawings.

Figure 1:
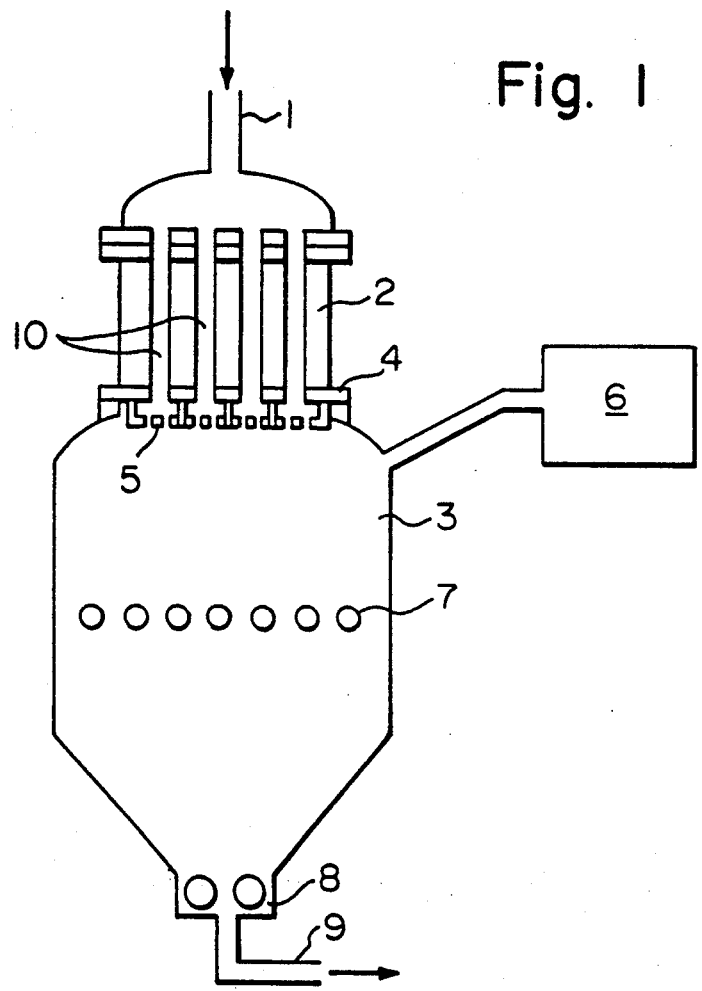
FIG. 1 is a schematic sectional view showing an example of the apparatus for devolatilizing polymer solution according to the invention.
Figure 14:
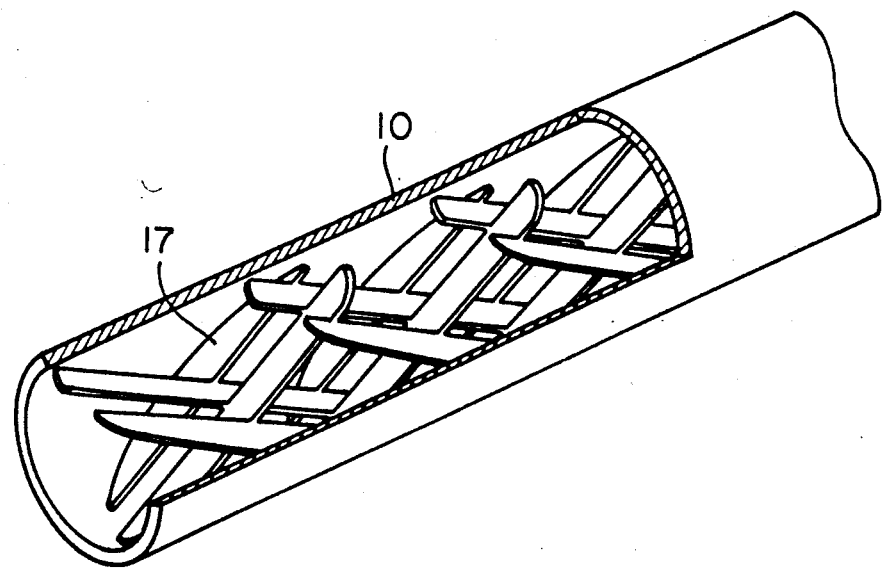
FIG. 14 is a prospective view with a breakaway section of a Sulzer-type tubular mixer.

In the apparatus shown in FIG. 1, polymer solution is supplied from a polymerization process through a ductline 1 to a vertical multi-tube heat exchanger 2. A volatilizer 3 is coupled to the underside of the heat exchanger 2. The heat exchanger 2 has a lower tube plate 4. A distributor 5 is mounted on the lowerside of the tube plate 4. The volatilizer 3 is connected to vacuum means 6 for evacuating it or reducing pressure in it. A plurality of horizontal heat retaining tubes 7, through which a heat medium can flow, are provided in the volatilizer 3 substantially at a vertically mid-way position thereof. The bottom of the volatilizer 3 is coupled to a gear pump 8 for pumping devolatilized polymer solution to a ductline 9. Static mixing elements shown at 17 in FIG. 14 without any moving parts may be provided in each of tubes 10 of the vertical multitube heat exchanger 2.

FIGS. 2 to 5 are fragmentary enlarged-scale sectional views showing examples of a mounting portion of distributor 5.

Figure 2:
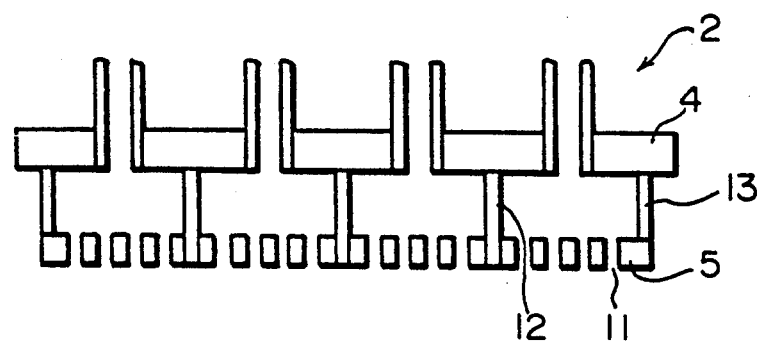
FIGS. 2 to 5 are fragmentary enlarged-scale sectional views showing respective examples of a distributor mounting portion.

In the example of FIG. 2, a distributor 5, having a number of holes 11, is mounted via stays 12. The stays 12 each have one end welded to the tube plate 4 of the heat exchanger 2 and the other end welded to the distributor 5. A peripheral wall 13 is welded to the outer periphery of the distributor 4 and also to the tube plate 4.

Figure 3:
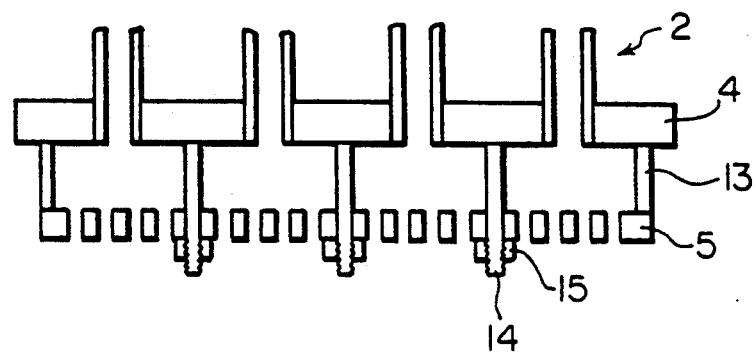

In the example of FIG. 3, a distributor 5 having a peripheral wall 13 is mounted with stay bolts 14 welded to the tube plate 4 of the heat exchanger 4 and nuts 15.

Figure 4:
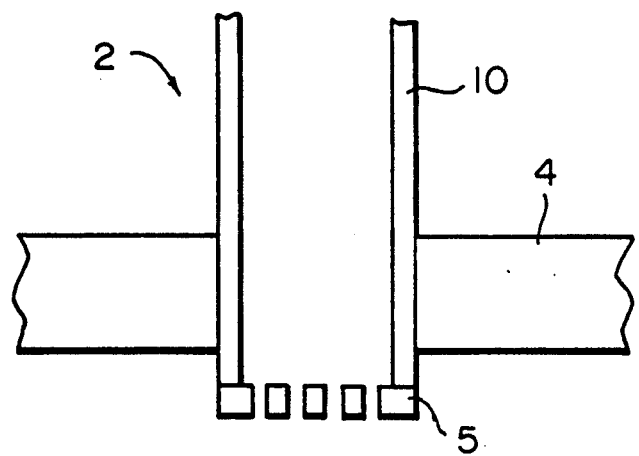

In the example of FIG. 4, a distributor 5 is directly welded to an outlet of tube 10 of the heat exchanger 2.

Figure 5:
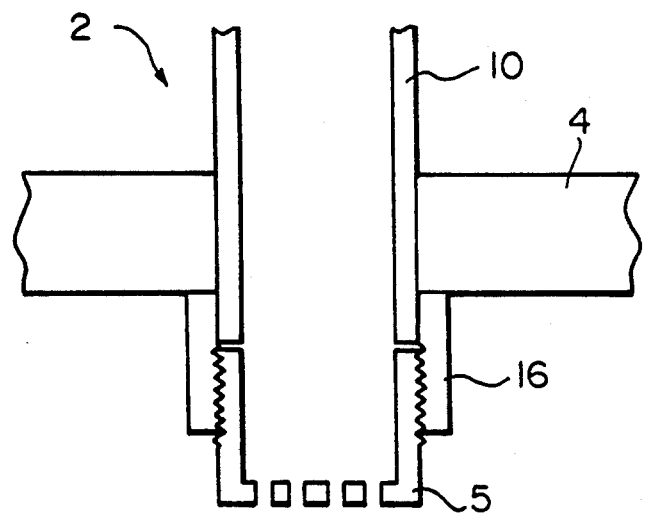

In the example of FIG. 5, a screw fitting 16 is welded to an outlet portion of tube 10 of the heat exchanger 2, and a distributor 5 with a screw-formed peripheral wall is mounted in the fitting 16.

The examples of FIGS. 3 to 5 are suitable in that the distributor 5 can be readily removed or replaced.

Figure 6:
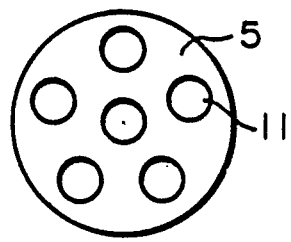
FIGS. 6 to 8 are plan views showing examples of the suitable shape of distributor holes or openings.
Figure 7:
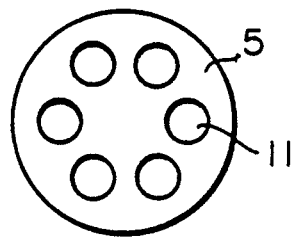
Figure 8:
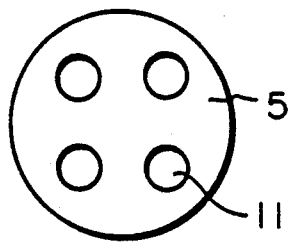

FIGS. 6 to 8 are plan views showing examples of the shape and arrangement of holes 11 of the distributor 5 mounted on the outlet portion of tube 10 of the heat exchanger 2. The holes are suitably circular as shown, and their arrangement is suitably as those shown in FIGS. 7 and 8, in which no hole is formed in a central portion of tube, in which the speed velocity of polymer solution is maximum, in view of uniformalizing the speed velocity of flow of polymer solution.

Figure 9:
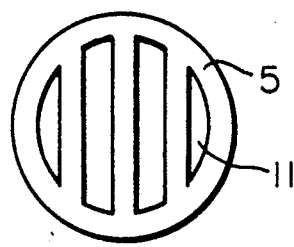
FIGS. 9 to 13 are plan views showing examples of other shape and arrangement of distributor holes or openings.
Figure 10:
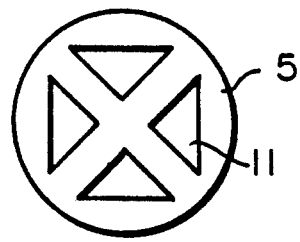
Figure 11:
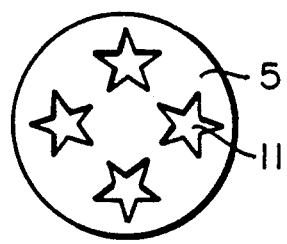
Figure 12:
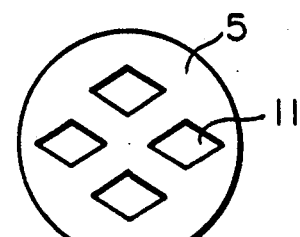
Figure 13:
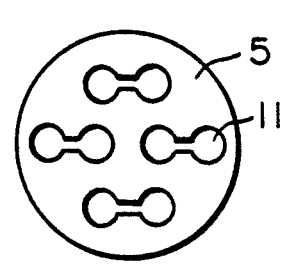

FIGS. 9 to 13 are plan views showing other examples of other shapes than circular shape of holes 11 in the distributor 5 mounted on an outlet portion of tube 10 of the heat exchanger 2. In the example of FIG. 9, slit-like holes are formed. In the example of FIG. 10, triangular holes are formed. In the example of FIG. 11, star-like holes are formed. In the example of FIG. 12, parallelogramic holes are formed. In the example of FIG. 13, gourd-shaped holes are formed.

Tests

Comparison tests were conducted using a devolatilization apparatus (A) according to the invention like that shown in FIG. 1 except for that the temperature preservation tubes 7 are not provided and that the distributor 5 is like that shown in FIG. 4, a devolatilization apparatus (B) according to the invention like that of FIG. 1 except for that the temperature preservation tubes 7 are not provided and that the distributor 5 is like that shown in FIG. 2, and a comparative devolatilization apparatus (C) like that shown in FIG. 2 except that neither distributor 5 nor heat preservation tubes 7 are provided.

A monomer mixture consisting of 95% by weight of styrene and 5% by weight of toluene was polymerized until the polymerization conversion is 85% by weight and was treated using apparatus (D) like apparatus (A) except that a plurality of static mixing elements without any moving parts are provided in each heat exchanger tube to obtain polymer solution with a volatile constituent concentration of 2,700 ppm. To the resultant polymer solution was added 2% by weight of water, and the resultant solution was mixed in a Sulzer mixer SNx with static mixing elements having no moving parts. The solution was then supplied to the apparatuses (A), (B) and (C) at a rate of 3,000 liters per hour. The supplied polymer solution was elevated to temperature of 230° C. in the heat exchanger 2 with a tube inner diameter of 20 mm. The polymer solution was then supplied through a distributor, which has 6 holes with a diameter of 3 mm for each heat exchanger tube, in case of the apparatuses (A) and (B) and directly in the case of apparatus (C) to the volatilizer for removal of volatile constituents by holding a volatilizer inner pressure of 20 mmHg, followed by pumping out from the gear pump, thus obtaining devolatilized polystyrene.

The residual volatile constituent concentration of polystyrene was 177 ppm in case of using the apparatus (A) according to the invention and 233 ppm in case of using the apparatus (B) according to the invention, whereas it was 394 ppm in case of using the comparative apparatus (C).

We claim:

1. A method of devolatilizing a liquid composition containing a styrene-based polymer and volatile constituents which comprises feeding the liquid composition to the inlet of a vertical multi-tube heat exchanger whereby a stream of the liquid composition flows downwardly through each of the tubes of said heat exchanger to thereby raise the temperature of said liquid composition in each said stream, subdividing each of the heat exchanged liquid streams flowing from the outlet of each of said heat exchange tubes into a plurality of subdivided liquid streams by passing each liquid stream through an apertured distributor mounted directly to the outlet end of each respective heat exchanger tube, and volatilizing the plurality of subdivided liquid streams flowing through the apertured distributors in a first volatilization zone located below the vertical multi-tube heat exchanger and apertured distributors.

2. The method of claim 1 which further comprises mixing the liquid composition stream in each of the vertical heat exchange tubes.

3. The method of claim 2 wherein the mixing is caused by flowing the liquid stream passed a plurality of non-moving static mixing elements provided in said vertical heat exchange tubes.

4. The method of claim 1 wherein said liquid composition contains less than about 1% by weight of volatile constituents.

5. The method of claim 1 wherein said liquid composition is a styrene-based polymer solution with a polymerization conversion of 80 to 95% by weight.

6. The method of claim 1 which further comprises passing the devolatilized liquid from the first volatilization zone into a second volatilization zone via a tubular mixer with a plurality of inner static mixing elements having no moving parts.

7. The method of claim 6 which further comprises adding a bubble-forming agent to the devolatilized liquid from the first volatilization zone prior to the inlet of said tubular mixer.

8. An apparatus for devolatilizing liquid composition containing polymer and volatile constituents comprising a vertical multi-tube heat exchanger, a volatilizer coupled to the underside of said heat exchanger and vacuum means connected to said volatilizer, and a distributor provided between said heat exchanger and said volatilizer, wherein said distributor is directly mounted on the outlet of each tube of said vertical multi-tube heat exchanger.

9. The apparatus according to claim 8, wherein a plurality of static mixing elements having no moving parts are provided in each tube of the vertical multi-tube heat exchanger.

10. The apparatus according to claim 8, wherein each said distributor has 4 to 10 circular holes with a diameter of 3 to 5 mm.

11. The apparatus according to claim 10, wherein each said distributor does not have any hole in a central portion.

* * * * *